(12) United States Patent
Ito

(10) Patent No.: US 8,569,649 B2
(45) Date of Patent: Oct. 29, 2013

(54) OPTICAL DEVICE AND LASER BEAM MACHINING APPARATUS HAVING OPTICAL DEVICE

(75) Inventor: Yusaku Ito, Ota-Ku (JP)

(73) Assignee: Disco Corporation, Tokyo (JP)

(*) Notice: Subject to any disclaimer, the term of this patent is extended or adjusted under 35 U.S.C. 154(b) by 187 days.

(21) Appl. No.: 13/179,131

(22) Filed: Jul. 8, 2011

(65) Prior Publication Data

US 2012/0018412 A1 Jan. 26, 2012

(30) Foreign Application Priority Data

Jul. 20, 2010 (JP) .................................. 2010-163280

(51) Int. Cl.
*B23K 26/00* (2006.01)

(52) U.S. Cl.
USPC ............ 219/121.67; 219/121.73; 219/121.74; 219/121.75; 219/121.76; 219/121.77

(58) Field of Classification Search
USPC ............ 219/121.73, 121.74, 121.75, 121.76, 219/121.77; 359/618
See application file for complete search history.

(56) References Cited

U.S. PATENT DOCUMENTS

| | | | | |
|---|---|---|---|---|
| 4,734,550 A | * | 3/1988 | Imamura et al. ......... | 219/121.77 |
| 4,861,983 A | * | 8/1989 | Sasada et al. ................. | 250/235 |
| 4,901,297 A | * | 2/1990 | Komatsu et al. ........... | 369/13.37 |
| 5,072,091 A | * | 12/1991 | Nagata et al. ............. | 219/121.68 |
| 5,231,263 A | * | 7/1993 | Kuwabara et al. ....... | 219/121.68 |
| 5,821,497 A | * | 10/1998 | Yamazaki et al. ....... | 219/121.69 |
| 6,128,120 A | * | 10/2000 | Mushiake et al. ......... | 359/221.1 |
| 6,563,082 B2 | * | 5/2003 | Terada et al. ............. | 219/121.72 |
| 6,693,257 B1 | * | 2/2004 | Tanaka ....................... | 219/121.76 |
| 6,900,942 B2 | * | 5/2005 | Gullapalli ...................... | 359/618 |
| 6,961,124 B2 | * | 11/2005 | Engelhardt et al. ........... | 356/417 |
| 7,154,673 B2 | * | 12/2006 | Tsukihara et al. ............. | 359/618 |
| 7,459,655 B2 | * | 12/2008 | Nomaru .................... | 219/121.78 |
| 7,714,249 B2 | * | 5/2010 | Nomaru .................... | 219/121.62 |
| 2002/0060210 A1 | * | 5/2002 | Terada et al. ............. | 219/121.76 |
| 2005/0236381 A1 | * | 10/2005 | Nomaru .................... | 219/121.74 |
| 2005/0270650 A1 | * | 12/2005 | Tsukihara et al. ............ | 359/618 |
| 2008/0111981 A1 | * | 5/2008 | Visser et al. ..................... | 355/67 |
| 2008/0296275 A1 | * | 12/2008 | Oba et al. .................. | 219/121.75 |
| 2008/0297731 A1 | * | 12/2008 | Powell et al. .................... | 353/37 |
| 2008/0309999 A1 | * | 12/2008 | Yoshikawa et al. ............. | 359/24 |
| 2010/0072183 A1 | * | 3/2010 | Park ......................... | 219/121.72 |
| 2010/0294749 A1 | * | 11/2010 | Kempe et al. ............. | 219/121.72 |
| 2011/0163077 A1 | * | 7/2011 | Partlo et al. .............. | 219/121.66 |
| 2012/0206802 A1 | * | 8/2012 | Yamazaki ................ | 359/484.03 |

FOREIGN PATENT DOCUMENTS

| | | |
|---|---|---|
| JP | 10-305420 | 11/1998 |
| JP | 2001-121281 | 5/2001 |
| JP | 2003-531393 | 10/2003 |

\* cited by examiner

*Primary Examiner* — Henry Yuen
*Assistant Examiner* — Jimmy Chou
(74) *Attorney, Agent, or Firm* — Greer, Burns & Crain, Ltd.

(57) ABSTRACT

An optical device includes: a beam splitter by which a laser beam emitted from an oscillator is branched into a first branch beam going ahead through transmission and a second branch beam going ahead through reflection; a first mirror by which the first branch beam going out of the beam splitter is reflected to go again toward the beam splitter; a second mirror by which the second branch beam going out of the beam splitter is reflected to go again toward the beam splitter; and a circular disk-like rotating unit for integrally rotating the first mirror and a second mirror, with a laser beam branch point in the beam splitter as a center of rotation.

5 Claims, 8 Drawing Sheets

OPTICAL DEVICE AND LASER BEAM MACHINING APPARATUS HAVING OPTICAL DEVICE

BACKGROUND OF THE INVENTION

1. Field of the Invention

The present invention relates to an optical device for irradiating a wafer with a laser beam or beams and a laser beam machining apparatus having the same.

2. Description of the Related Art

In a semiconductor device manufacturing process, a semiconductor work having a roughly circular disk-like shape wherein a plurality of regions are demarcated by streets (cutting lines) arranged in a grid pattern on a face side of the semiconductor work and circuits such as ICs, LSIs, etc. are formed in the thus demarcated regions is cut along the streets to thereby divide the semiconductor work on a circuit basis into individual semiconductor chips. The cutting of the semiconductor work along the streets is normally carried out using a cutting apparatus called dicer, and a machining method of cutting by irradiation with a laser beam has also been conducted (see, for example, Japanese Patent Laid-Open No. Hei 10-305420).

In addition, an optical system in which a laser beam is branched into two laser beams so as to enable simultaneous machining at two locations, for the purpose of enhancing machining efficiency, has also been proposed (see, for example, Japanese Patent Laid-Open No. 2001-121281 and JP-T-2003-531393).

SUMMARY OF THE INVENTION

The above-mentioned optical system is a system in which a galvano-mirror or a wedge-shaped prism is rotated respectively about two or more axes, thereby controlling the two beams. Thus, the system is disadvantageous in that drive control is complicated and a high cost and large space are required.

In consideration of the foregoing, it is an object of the present invention to provide an optical device wherein branching of a laser beam into two beams and control of the spacing between the two beams can be achieved with a simpler configuration than those in the related art, and a laser beam machining apparatus having the optical system.

In accordance with an aspect of the present invention, there is provided an optical device including: an oscillator for emitting a laser beam; a branching mechanism by which the laser beam emitted from the oscillator is branched into two laser beams; and a condenser for condensing the two laser beams going out of the branching mechanism, wherein the branching mechanism includes a beam splitter by which the laser beam emitted from the oscillator is branched into a first branch beam going ahead through transmission and a second branch beam going ahead through reflection, a first mirror by which the first branch beam going out of the beam splitter is reflected to go again toward the beam splitter, a second mirror by which the second branch beam going out of the beam splitter is reflected to go again toward the beam splitter, a rotating unit for integrally rotating the first mirror and the second mirror, with a laser beam branch point in the beam splitter as a center of rotation, and a control unit for rotating the rotating unit to change an angle of incidence of the first branch beam on the first mirror and an angle of incidence of the second branch beam on the second mirror so as thereby to control an angle formed between the first branch beam reflected by the beam splitter after being reflected by the first mirror and the second branch beam transmitted through the beam splitter after being reflected by the second mirror; and the condenser is disposed on optical paths of the first branch beam which has been transmitted through the beam splitter, has thereafter been reflected by the first mirror to be again incident on the beam splitter, and has been reflected by the beam splitter to go out of the beam splitter, and the second branch beam which has been reflected by the beam splitter, has thereafter been reflected by the second mirror to be again incident on the beam splitter, and has been transmitted through the beam splitter to go out of the beam splitter.

Preferably, the beam splitter is a polarization beam splitter, and the branching mechanism includes a first quarter-wave plate disposed between the laser beam branch point and the first mirror and a second quarter-wave plate disposed between the laser beam branch point and the second mirror. Preferably, the beam splitter is a half-mirror.

Preferably, the branching mechanism further includes a first intermediate mirror by which the first branch beam going out of the beam splitter is reflected into a direction parallel to a rotational axis passing through the center of rotation, and a second intermediate mirror by which the second branch beam going out of the beam splitter is reflected into a direction parallel to the rotational axis passing through the center of rotation; and the branching mechanism is so set that the first mirror causes the first branch beam reflected by the first intermediate mirror to be incident on the beam splitter at a position spaced along the rotational axis direction from the position of incidence of the laser beam emitted from the oscillator, and that the second mirror causes the second branch beam reflected by the second intermediate mirror to be incident on the beam splitter at a position spaced along the rotational axis direction from the position of incidence of the laser beam emitted from the oscillator.

According to the present invention, an optical device wherein branching of a laser beam into two beams and control of the spacing between the two beams can be achieved with only a one-axis rotational driving mechanism and a laser beam machining apparatus having the optical device can be realized.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Now, optical devices according to embodiments of the present invention and a laser beam machining apparatus according to the invention will be described below, based on the attached drawings.

Embodiment 1

Figure 1:
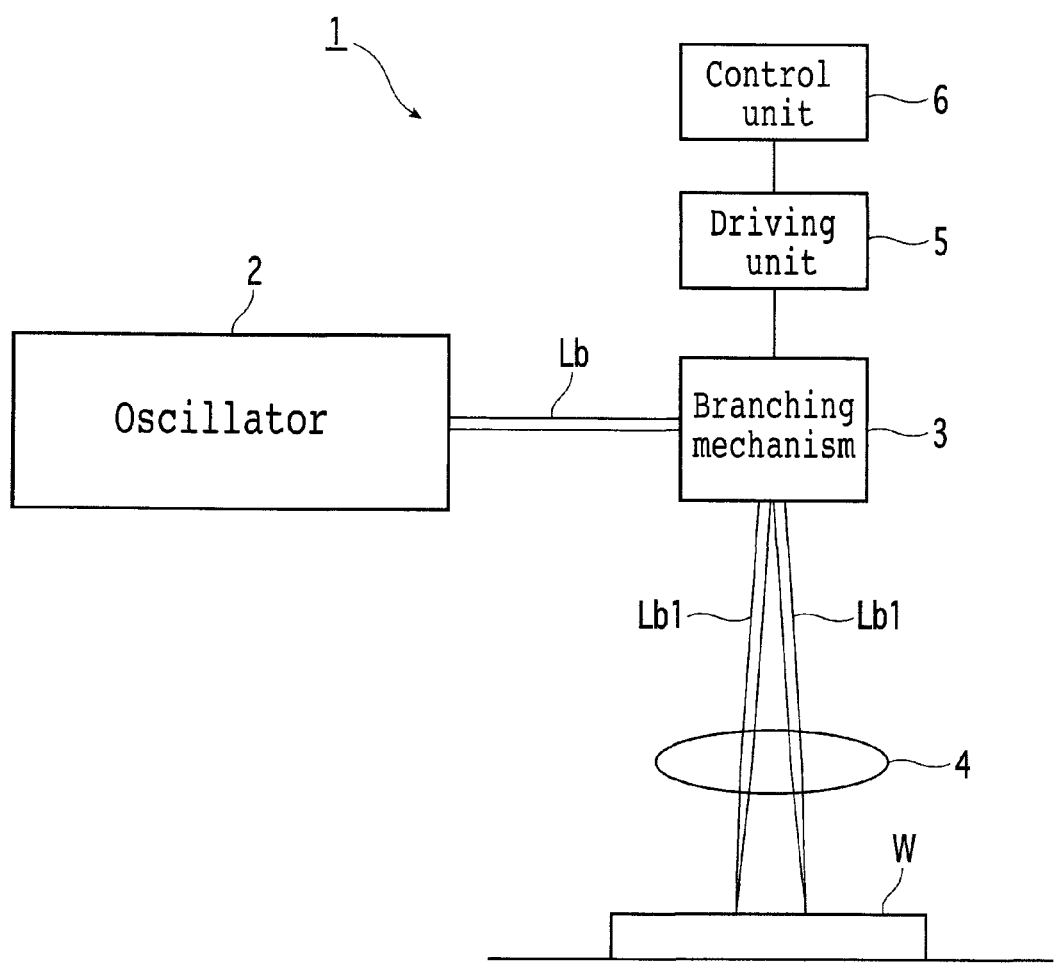
FIG. 1 is a schematic block diagram of an optical device according to Embodiment 1 of the present invention.
Figure 2:
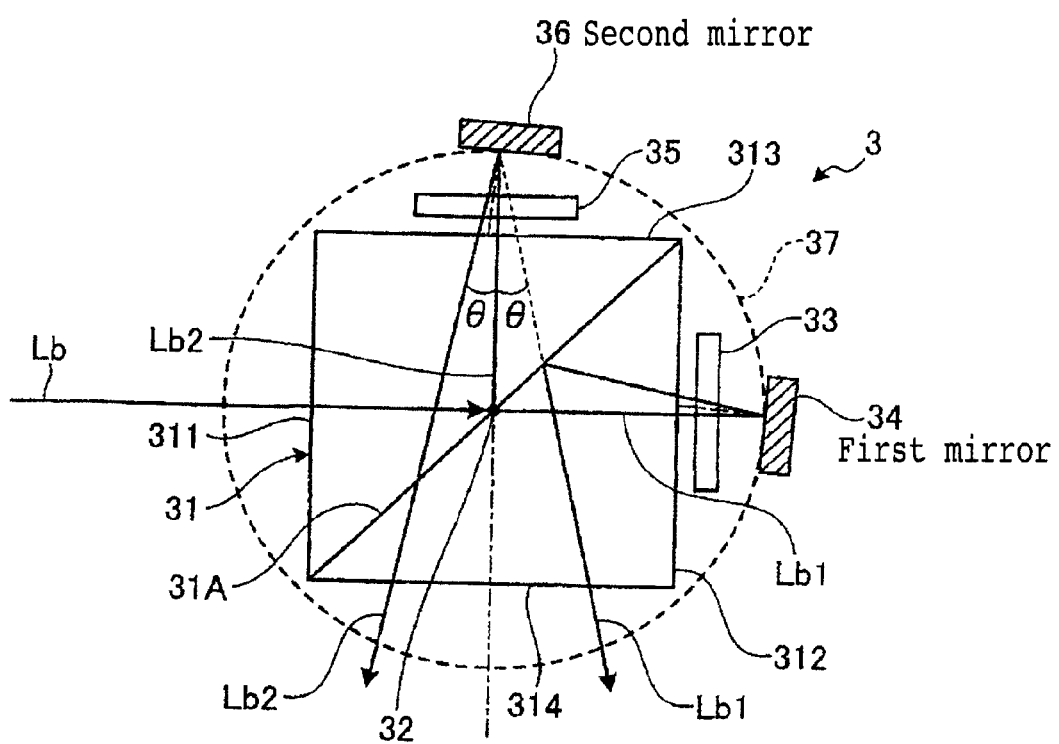
FIG. 2 is an illustration of a branching mechanism in the optical device according to Embodiment 1 of the invention.

FIGS. 1 to 3 illustrate an optical device 1 according to Embodiment 1 of the present invention. The optical device 1 according to this embodiment is applicable to the case of performing laser beam machining at the time of dividing a work along planned dividing lines. As shown in FIG. 1, the optical device 1 includes an oscillator 2 for emitting a laser beam Lb, a branching mechanism 3 on which the laser beam Lb emitted from the oscillator 2 is incident and by which the laser beam Lb is branched into two beams including a first branch beam Lb1 and a second branch beam Lb2, to be emitted as the two beams or as one beam, a condenser 4 by which the laser beams going out of the branching mechanism 3 is condensed and controlled to be incident on the work W while having a predetermined beam diameter, a driving unit 5 for driving the branching mechanism 3 for a controlling purpose, and a control unit 6 for controlling the driving unit 5.

The oscillator 2 is for emitting a laser beam of a predetermined wavelength; for example, various laser beam oscillators such as a YAG laser oscillator, an YVO4 laser oscillator, etc. can be applied as the oscillator 2.

As shown in FIG. 2, the branching mechanism 2 includes a beam splitter 31 by which the laser beam Lb emitted from the oscillator 2 is branched into the first branch beam Lb1 going ahead through transmission and the second branch beam Lb2 going ahead through reflection, a first mirror 34 by which the first branch beam Lb1 going out of the beam splitter 31 is reflected to go again toward the beam splitter 31, a second mirror 36 by which the second branch beam Lb2 going out of the beam splitter 31 is reflected to go again toward the beam splitter 31, and a circular disk-like rotating unit 37 for integrally rotating the first mirror 34 and the second mirror 36, with a branch point 32 for the laser beam Lb in the beam splitter 31 as a center of rotation.

Particularly, the first mirror 34 and the second mirror 36 are so set as to be rotationally moved on the same circle, attendant on rotation of the rotating unit 37. In other words, the first mirror 34 and the second mirror 36 are so set that the distances from them to the branch point 32 are equal.

The rotating unit 37 is rotated by driving the driving unit 5 shown in FIG. 1, whereby the angle of incidence of the first branch beam Lb1 on the first mirror 34 and the angle of incidence of the second branch beam Lb2 on the second mirror 36 are changed. Accordingly, the angle 2θ (see FIG. 2) formed between the first branch beam Lb1 reflected by the beam splitter 31 after reflected by the first mirror 34 and the second branch beam Lb2 transmitted through the beam splitter 31 after reflected by the second mirror 36 is controlled by driving the rotating unit 37.

The beam splitter 31 is for dividing the laser beam Lb emitted from the oscillator 2 into two beams; in this embodiment, a polarization beam splitter capable of separating polarized light components is used as the beam splitter 31. The beam splitter 31 has a structure in which two right-angled prisms are bonded to each other to form a square prism-shaped body, and a bonding surface 31A is coated with a dielectric multilayer film or a metallic thin film. In addition, the beam splitter 31 used in this embodiment is a half-mirror such that the ratio of the intensity of reflected light to the intensity of transmitted light is roughly 1:1.

In this embodiment, the beam splitter 31 is a polarization beam splitter. In the beam splitter 31, therefore, a first quarter-wave plate 33 is arranged between the first mirror 34 and a surface 312 from which the first branch beam Lb1 going ahead after transmitted through the bonding surface 31A is emitted. In addition, in the beam splitter 34, a second quarter-wave plate 35 is arranged between the second mirror 36 and a surface 313 from which the second branch beam Lb2 going ahead after reflected on the bonding surface 31A is emitted. Such an arrangement ensures that the first branch beam Lb1 transmitted through the bonding surface 31A in the beam splitter 31 is reflected by the first mirror 34, so as to pass through the first quarter-wave plate 33 twice and to return to the bonding surface 31A with its linear polarization state having been rotated by 90°, and, therefore, it is now reflected on the bonding surface 31A. On the other hand, the second branch beam Lb2 reflected on the bonding surface 31A is reflected by the second mirror 36, so as to pass through the second quarter-wave plate 35 twice and to return to the bonding surface 31A with its linear polarization state having been rotated by 90°, and, therefore, it is now transmitted through the bonding surface 31A. In this embodiment, the beam splitter 31 is a polarization beam splitter, which ensures that the energy loss of the beam at the time of branching is reduced, as compared with the case where a non-polarization beam splitter is used.

As shown in FIG. 2, in this embodiment, the beam splitter 31 is on the stationary side, and the first mirror 34 and the second mirror 36 are turned around the beam splitter 31 by rotating the rotating unit 37. Incidentally, the rotating unit 37 has a rotational axis on a straight line which passes through the branch point 32 for the laser beam Lb in the beam splitter 31 and which is orthogonal to a plane formed by the first and second branch beams immediately after branching at the branch point 32. The first mirror 34 and the second mirror 36 are arranged at positions spaced from each other by an angular interval of 90° along the circumferential edge of the circular disk-like rotating unit 37, and are so mounted that their mirror surfaces are set in tangent directions in relation to the circumferential edge of the rotating unit 37. Incidentally, FIG. 2 shows a condition where the mirrors have been rotationally moved a little clockwise in the figure, relative to the first branch beam Lb1 transmitted after branching at the branch point 32, for the beam Lb incident on a surface 311 of the beam splitter 31, and the second branch beam Lb2 reflected at the branch point 32.

The driving unit 5 has a motor for rotationally driving the rotating unit 37, etc., and the control unit 6 is so designed as to control the rotational driving amount of the rotating unit 37 through driving of the driving unit 5. Specifically, the control unit 6 performs a control for changing the spacing between the two beams emitted finally from the branching mechanism 3, a control in the case of finally obtaining a single beam, and the like control, by regulating the rotating angle of the rotating unit 37.

As the condenser 4, an fθ lens is preferably used, for facilitating the control of angle. In this embodiment, in the condition where such an fθ lens is used, a setting is made such that when the reflection angle θ at the first mirror 34 and the second mirror 36 is regulated to 0.001°, the beam spacing is controlled to 100 µm (the beams are each spaced by 50 µm from a central position).

Figure 3A:
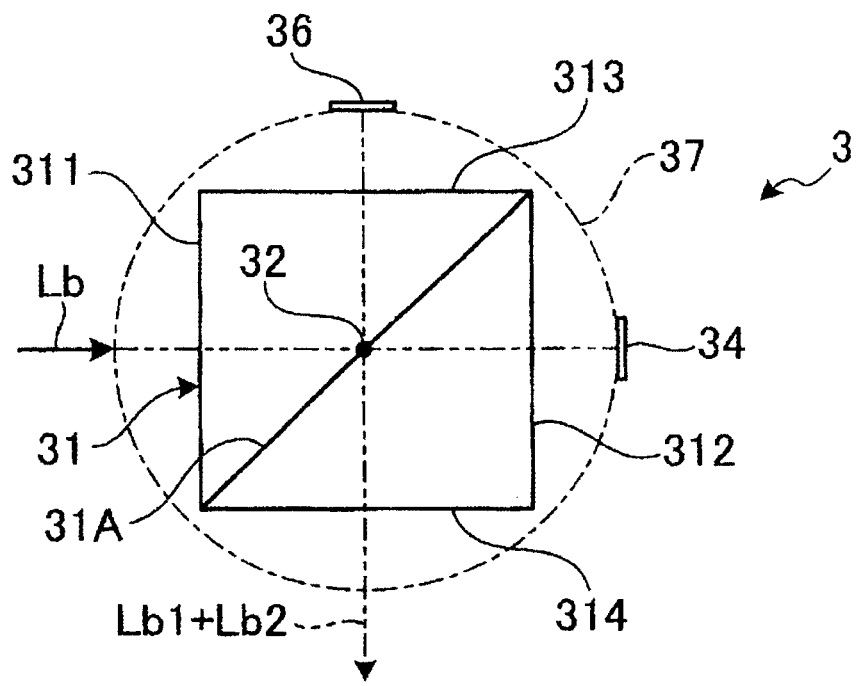
FIG. 3A is a diagram showing branch beams in the case where the angle of incidence on mirrors in the branching mechanism is 0 degree, in the optical device according to Embodiment 1 of the invention.

Now, referring to FIGS. 3A to 3E, operation of the branching mechanism 3 will be described below. Incidentally, in FIGS. 3A to 3E, the first quarter-wave plate 33 and the second quarter-wave plate 35 are omitted, for simplification of description. FIG. 3A shows a case wherein the first branch beam Lb1 transmitted through the bonding surface 31A of the beam slitter 31 is perpendicularly incident on the first mirror 34, and the second branch beam Lb2 reflected on the bonding surface 31A is perpendicularly incident on the second mirror 36. In this case, the beam Lb1 emitted from the surface 312 of the beam splitter 31 is reflected by the first mirror 34, to return to the branch point 32, and is reflected by the bonding surface 31A, to be emitted from a surface 314. In addition, the beam Lb1 emitted from the surface 313 of the beam splitter 31 is reflected by the second mirror 36, to return to the branch point 32, and is transmitted through the bonding surface 31A, to join the beam Lb1 emitted from the surface 314. In this case, therefore, the beam emitted from the surface 314 is a beam containing both the first branch beam Lb1 and the second branch beam Lb2, so that the beam intensity is high.

Figure 3B:
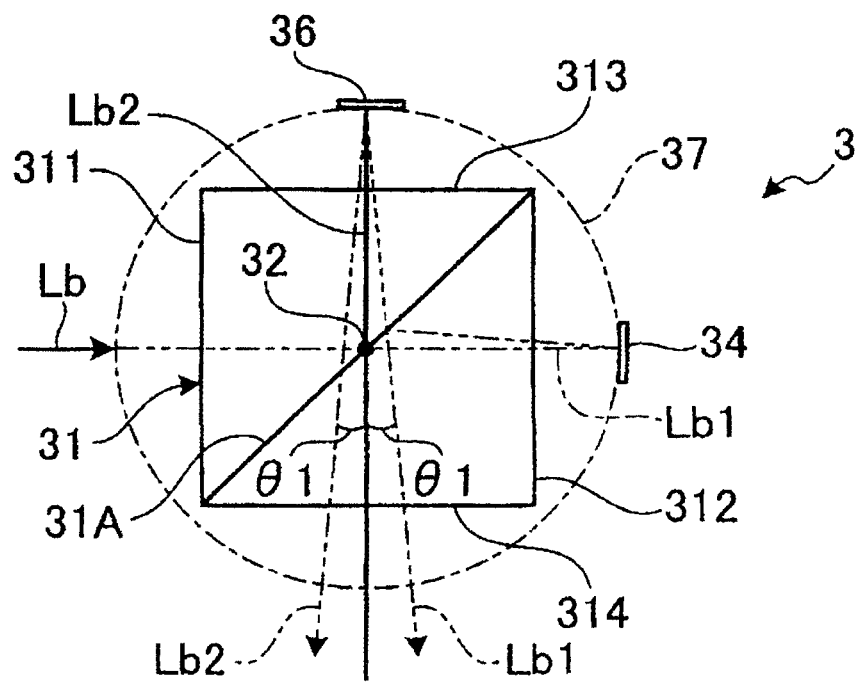
FIG. 3B is a diagram showing a condition where the mirrors in the branching mechanism have been rotated clockwise by θ1, in the optical device according to Embodiment 1 of the invention.
Figure 3C:
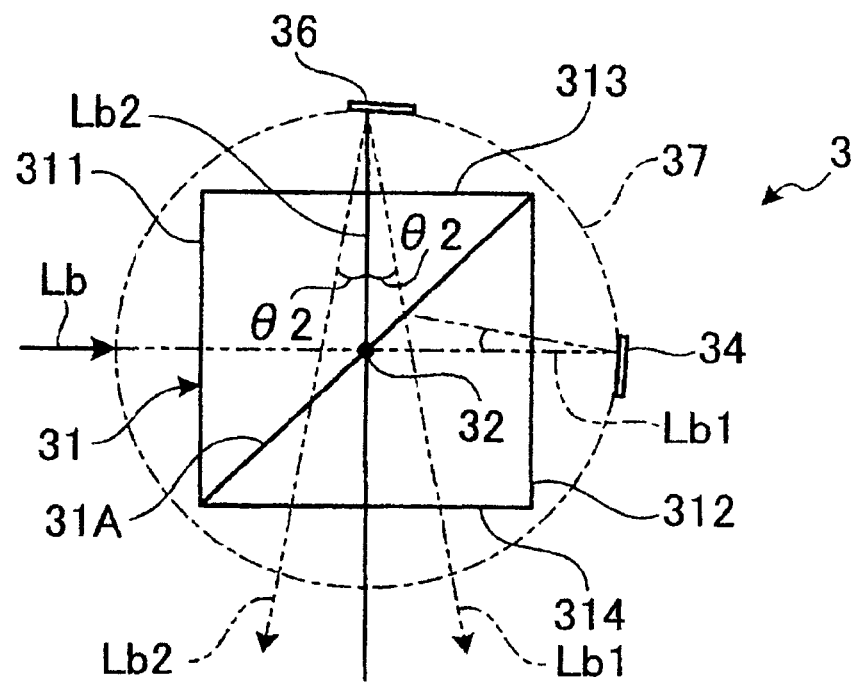
FIG. 3C is a diagram showing a condition where the mirrors in the branching mechanism have been rotated clockwise by θ1, in the optical device according to Embodiment 1 of the invention.

FIG. 3B shows a condition where the rotating unit 37 has been rotationally moved clockwise by a small angle of θ1 from the condition of FIG. 3A. In this case, the first branch beam Lb1 branched at the branch point 32 is reflected by the first mirror 34 toward the bonding surface 31A in the vicinity of the branch point 32, and is reflected by the bonding surface 31A, to be emitted from the surface 314. The first branch beam Lb1 thus emitted from the surface 314 forms an angle of −θ1 against the normal to the surface 314. The second branch beam Lb2 branched at the branch point 32 is reflected by the second mirror 36 toward the bonding surface 31A in the vicinity of the branch point 32, and is transmitted through the bonding surface 31A, to be emitted from the surface 314. The second branch beam Lb2 thus emitted from the surface 314 forms an angle of +θ1 against the normal to the surface 314. Therefore, with the rotating unit 37 rotated by θ1, the angle formed between the first branch beam Lb1 and the second beam Lb3, both emitted from the surface 314, can be set to 2θ1. In this embodiment, a setting is made such that when the reflection angle θ at the first mirror 34 and the second mirror 36 is set to 0.001°, the spacing between the finally emitted beams is 100 µm (the beams are each spaced by 50 µm from the central position). FIG. 3C shows a case where the rotating unit 37 has been further rotated clockwise by a total of θ2. In this case, the angle formed between the first branch beam Lb1 and the second branch beam Lb2, both emitted from the surface 314, can be set to 2θ2.

Figure 3D:
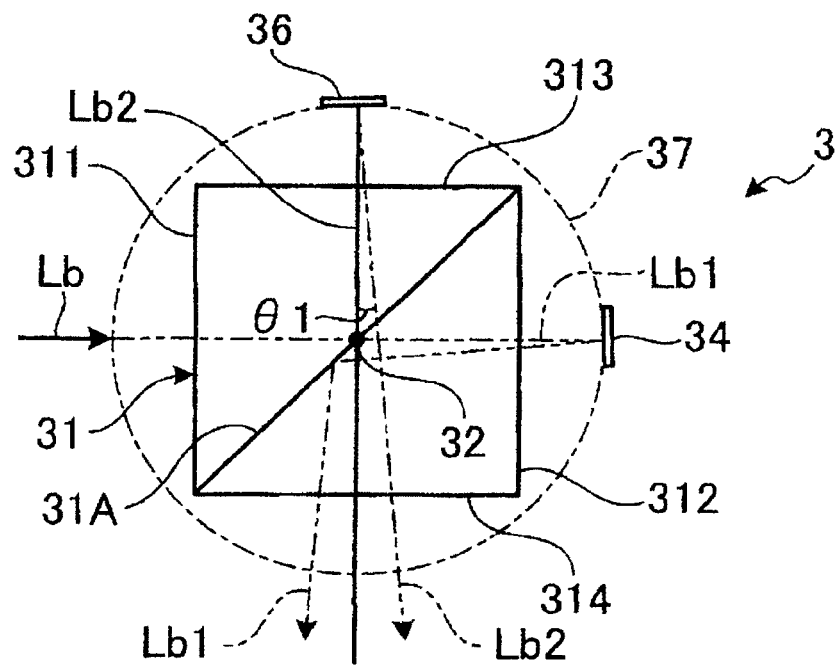
FIG. 3D is a diagram showing a condition where the mirrors in the branching mechanism have been rotated counterclockwise by θ1, in the optical device according to Embodiment 1 of the invention.
Figure 3E:
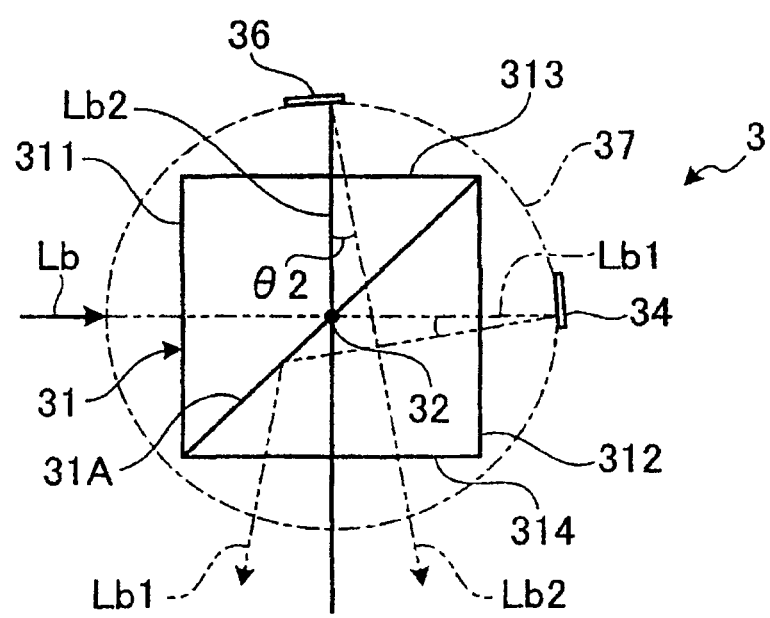
FIG. 3E is a diagram showing a condition where the mirrors in the branching mechanism have been rotated counterclockwise by θ2.

FIG. 3D shows a case where the rotating unit 37 has been rotated counterclockwise by θ1 relative to the beam splitter 31. In this case, the angle formed between the first branch beam Lb1 and the second branch beam Lb2, both emitted from the surface 314 of the beam splitter 31, is 2θ1, like in the case shown in FIG. 3B. FIG. 3E shows a case where the rotating unit 37 has been rotated counterclockwise by θ2, which is greater than θ1, relative to the beam splitter 31. In this case, the angle formed between the first branch beam Lb1 and the second branch beam Lb2, both emitted from the surface 314, is 2θ2, like in the case shown in FIG. 3C.

While the configuration and operation of the optical device 1 according to this embodiment have been described above, the optical device 1 makes it possible to easily carry out branching of a laser beam into two beams (Lb1, Lb2) and control of the spacing between the two beams by adopting the simple configuration in which the first mirror 34 and the second mirror 36 are integrally provided on the rotating unit 37.

In addition, by use of the optical device 1 according to this embodiment, as shown in FIG. 3A, a single beam can be emitted from the surface 314 of the beam splitter 31. This is applicable, for example, to the formation of a dividing groove along each of planned dividing lines on a wafer. Further, use of the optical device 1 ensures that a pair of mutually spaced shallow grooves for prevention of film exfoliation can be easily machined in both end portions in the width direction of each of the planned dividing lines on the wafer, by controlling the angle of the rotating unit 37 by the control unit 6. Accordingly, the formation of a structure capable of preventing film exfoliation by machining two such shallow grooves by use of the two beams and the subsequent formation of the dividing groove between the shallow grooves by use of the single beam can be carried out through a simple switching operation.

Further, in this embodiment, the polarization beam splitter and the quarter-wave plates 33, 35 are used, whereby the loss of beam at the time of branching the laser beam Lb is reduced, as compared with the case where a non-polarization beam splitter is used.

Embodiment 2

Now, referring to FIG. 4, an optical device according to Embodiment 2 of the present invention will be described below. Incidentally, the optical device according to this embodiment differs from the optical device 1 according to Embodiment 1 above only in the configuration of the branching mechanism 3A; therefore, descriptions of the configurations of other parts than the branching mechanism 3A will be omitted. Besides, the same parts as those in Embodiment 1 above will be denoted by the same symbols as used above, and the parts similar to those in Embodiment 1 will be denoted by symbols similar to those used above. In addition, also in this embodiment, a polarization beam splitter is used as the beam splitter 31, but quarter-wave plates are omitted in the drawing.

Figure 4:
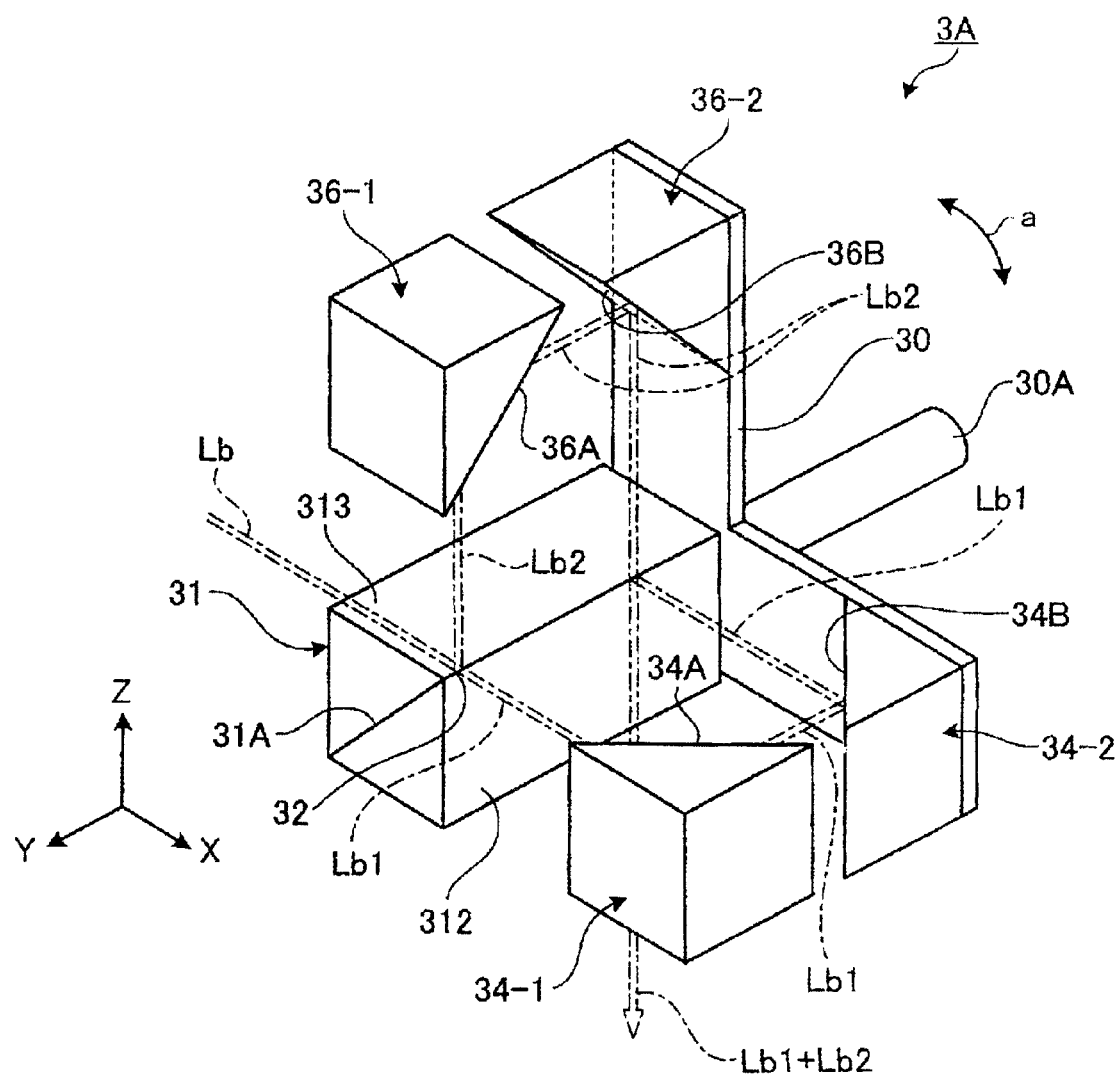
FIG. 4 is a perspective view showing a condition where a laser beam is made to be incident on a branching mechanism in an optical device according to Embodiment 2 of the present invention.

As shown in FIG. 4, a branching mechanism 3A according to this embodiment is provided, on the side of a surface 312 of a beam splitter 31, with a first intermediate mirror 34-1 on which a first branch beam Lb1 branched at a bonding surface 31A and transmitted through the bonding surface 31A is incident. A mirror surface 34A of the first intermediate mirror 34-1 is inclined by 45 degrees toward the direction opposite to a Y-direction, relative to the surface 312. In addition, the branching mechanism 3A is provided, on the side of a surface 313 of the beam splitter 31, with a second intermediate mirror 36-1 on which a second branch beam Lb2 branched at the bonding surface 31A and reflected by the bonding surface 31A is incident. A mirror surface 36A of the second intermediate mirror 36-1 is inclined by 45 degrees toward the direction opposite to the Y-direction, relative to the surface 313. The beam splitter 31 and the first intermediate mirror 34-1 and the second intermediate mirror 36-1 are in a fixed positional relationship.

The branching mechanism 3A is provided, in addition to the beam splitter 31 which is fixed, with a first mirror 34-2 and a second mirror 36-2 which can be rotated around the beam splitter 31. The first mirror 34-2 and the second mirror 36-2 are fixed correspondingly to end portions of an L-shaped arm 30 which is bent at a right angle. The arm 30 is provided with a rotating unit 30A at the bent portion thereof. A center axis of the rotating unit 30A is so set as to pass through a branch point 32 on the bonding surface 31A, on which a laser beam Lb is incident, in the beam splitter 31 and to be orthogonal to a plane formed by the first and second branch beams immediately after branching at the branch point 32. As shown in FIG. 4, the first mirror 34-2 and the second mirror 36-2 fixed to the arm 30 can be turned in the direction of arrow a. The rotating unit 30A is rotationally controlled by a driving unit 5 and a control unit 6, like in Embodiment 1 above.

A mirror surface 34B of the first mirror 34-2 and the mirror surface 34A of the first intermediate mirror 34-1 are disposed to be perpendicular to each other. The mirror surface 34A of the first intermediate mirror 34-1 is so set that the first branch beam Lb1 coming thereto from the branch point 32 is reflected into a direction parallel to the above-mentioned center axis. Specifically, the first branch beam Lb1 emitted from the mirror surface 34A of the first intermediate mirror 34-1 reaches the mirror surface 34B of the first mirror 34-2. In addition, a setting is made such that the first branch beam Lb1 emitted from the mirror surface 34B of the first mirror 34-2 is substantially perpendicularly incident on the surface 312 at a part, located in the direction opposite to the Y-direction relative to the branch point 32, of the beam splitter 31. A mirror surface 36B of the second mirror 36-2 is disposed to be perpendicular to the mirror surface 36A of the second intermediate mirror 36-1. Besides, a setting is made such that the second branch beam Lb2 emitted from the mirror surface 36A is substantially perpendicularly incident on the surface 313 at a part, located in the direction opposite to the Y-direction relative to the branch point 32, of the beam splitter 31.

Incidentally, in this embodiment, as for the arrangement position of the quarter-wave plates (not shown), specifically for the path of the first branch beam Lb1 having passed through the branch point 32, for example, it suffices for the quarter-wave plates to be arranged at two positions, namely, a position between the surface 312 and the first intermediate mirror 34-1 and a position between the first mirror 34-2 and the surface 312. In addition, for the path of the second branch beam Lb2, for example, it suffices for the quarter-wave plates to be arranged at two positions, namely, a position between the surface 313 and the second intermediate mirror 36-1 and a position between the second mirror 36-2 and the surface 313. Incidentally, when half-wave plates are used instead of using the quarter-wave plates, for example, it suffices that one half-wave plate is arranged at each of a position between the surface 312 and the first intermediate mirror 34-1 and a position between the surface 313 and the second intermediate mirror 36-1. In short, it suffices that either one half-wave plate or two quarter-wave plates are present on each optical path for the beam after going out of the beam splitter 31 and before being again incident on the beam splitter 31.

FIG. 4 shows a condition where the laser beam Lb is incident on the branch point 32 of the beam splitter 31 in the branching mechanism 3A, in an initial condition where the first mirror 34-2 and the second mirror 36-2 are not yet rotated. In this case, the first branch beam Lb1 having been branched at the branch point 32 and having passed through the bonding surface 31A is reflected on the mirror surface 34A of the first intermediate mirror 34-1, and is incident on the mirror surface 34B of the first mirror 34-2, to be reflected toward the surface 312. The first branch beam Lb1 incident on the surface 312 is reflected by the bonding surface 31A, to be emitted into the direction opposite to a Z-direction. The second branch beam Lb2 having been branched at the branch point 32 and reflected by the bonding surface 31A is reflected on the mirror surface 36A of the second intermediate mirror 36-1, and is incident on the mirror surface 36B of the second mirror 36-2, to be reflected toward the surface 313. The second branch beam Lb2 incident on the surface 313 is transmitted through the bonding surface 31A, to be emitted into the direction opposite to the Z-direction.

Also in the optical device according to this embodiment, by integrally turning the first mirror 34-2 and the second mirror 36-2 in the branching mechanism 3A, as shown in FIG. 4, it is possible to control the optical device into a condition where the first branch beam Lb1 and the second branch beam Lb2 are finally emitted in a mutually overlapping state, or a condition where these branch beams are emitted in the state of being space from each other by an arbitrary distance.

Particularly, in this embodiment, the first branch beam Lb1 and the second branch beam Lb2 once emitted from the beam splitter 31 are reflected through the first intermediate mirror 34-1 and the second intermediate mirror 36-1 and then through the first mirror 34-2 and the second mirror 36-2, whereby they are made to be incident on the beam splitter 31 at a place spaced from the branch point 32; therefore, deterioration of the beam splitter 31 by the laser beams can be restrained.

<Configuration of Laser Beam Machining Apparatus>

Figure 5:
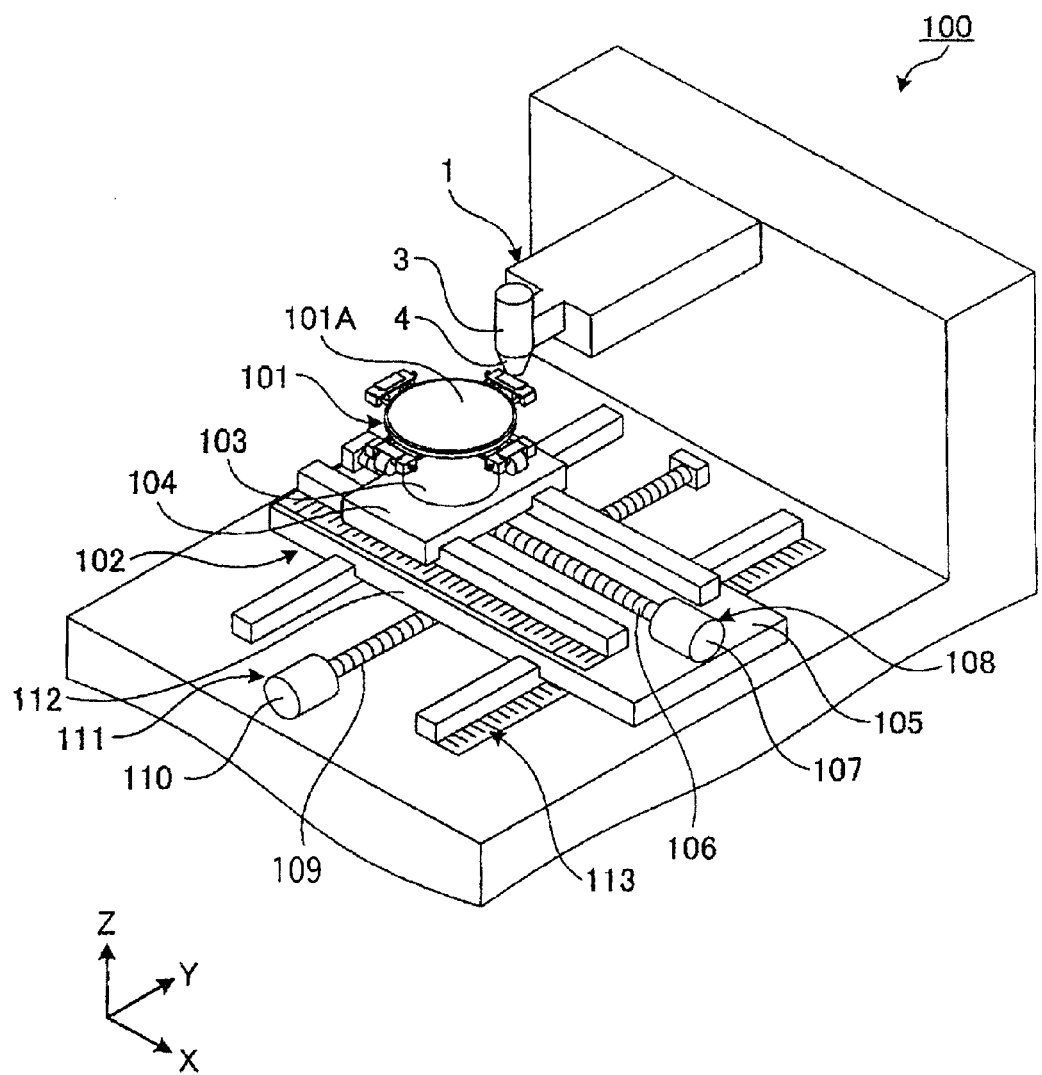
FIG. 5 is a perspective view of a laser beam machining apparatus according to an embodiment of the present invention.

Now, referring to FIG. 5, the configuration of a laser beam machining apparatus 100 obtained through application of the optical device 1 according to Embodiment 1 of the present invention will be described below. FIG. 5 is a schematic perspective view showing the configuration of the laser beam machining apparatus 100 according to an embodiment of the present invention. As shown in FIG. 5, the laser beam machining apparatus 100 includes a holding mechanism 101 for holding a work, an XY driving mechanism 102 for moving the holding mechanism 101 in an X-axis direction set as a machining feed direction and a Y-axis direction set as an indexing feed direction, the optical device 1 according to the above-described embodiment for irradiating the work held on the holding mechanism 101 with a laser beam or beams, and a controller (not shown) incorporated in the laser beam machining apparatus 100 for performing general control over components of the laser beam machining apparatus 100.

The holding mechanism 101 is composed mainly of a chuck table sized according to a work, and suction-holds the work placed on a holding surface 101A (upper surface) by suction means (not shown). The work, for example with its face side up, is fed into the holding mechanism 101 by conveying means (not shown), to be suction-held on the holding surface 101A. The holding mechanism 101 thus holding the work on the holding surface 101A is provided at the upper end of a cylindrical member 103, and can be freely rotated about a vertical line (center axis) by a pulse motor (not shown) disposed inside the cylindrical member 103.

The XY driving mechanism 102 has sliding blocks 104, 105 in two stages. The holding mechanism 101 is mounted on the two stages of sliding blocks 104, 105 through the cylindrical member 103. The XY driving mechanism 102 has a machining feeding mechanism 108 composed of a ball screw 106, a pulse motor 107 and the like, and the sliding block 104 can be freely moved in the X-axis direction by the machining feeding mechanism 108. With the machining feeding mechanism 108 driven to move the sliding block 103 and with the holding mechanism 101 moved in the X-axis direction relative to the optical device 1, the holding mechanism 101 mounted on the sliding block 104 and the optical device 1 are relatively moved along the X-axis direction. Incidentally, in regard of the X-axis direction serving as the machining feed direction, the direction indicated by arrow in FIG. 5 is referred to as positive direction, and the reverse direction as negative direction.

The XY driving mechanism 102 has an indexing feeding mechanism 111 composed of a ball screw 109, a pulse motor 110 and the like, and the sliding block 105 can be freely moved in the Y-axis direction by the indexing feeding mechanism 111. With the indexing feeding mechanism 111 driven to move the sliding block 105 and with the holding mechanism 101 moved in the Y-axis direction relative to the optical device 1, the holding mechanism 101 mounted on the sliding block 105 and the optical device 1 are relatively moved along the Y-axis direction.

In this embodiment, a configuration is adopted in which relative movements of the holding mechanism 101 and the optical device 1 are effected by moving the holding mechanism 101 in the X-axis direction and in the Y-axis direction. Alternatively, a configuration may be adopted in which the optical device 1 is moved in the X-axis direction and in the Y-axis direction while the holding mechanism 101 is kept unmoved. Further, a configuration may be adopted in which both the holding mechanism 101 and the optical device 1 are moved in opposite orientations along the X-axis direction, and both the holding mechanism 101 and the optical device 1 are moved in opposite orientations along the Y-axis direction, whereby relative movements of them are effected.

The machining feeding mechanism 108 is additionally provided with machining feed amount detection means 112 for detecting the machining feed amount of the holding mechanism 101. The machining feed amount detection means 112 includes a linear scale disposed along the X-axis direction, a reading head which is disposed on the sliding block 104 and moved together with the sliding block 104 to thereby read the linear scale, and the like. Similarly, the indexing feeding mechanism 111 is additionally provided with indexing feed amount detection means 113 for detecting the indexing feed amount of the holding mechanism 101. The indexing feed amount detection means 113 includes a linear scale disposed along the Y-axis direction, a reading head which is disposed on the sliding block 105 and moved together with the sliding block 105 to thereby read the linear scale, and the like.

The optical device 1 is for irradiating the work suction-held on the holding surface 101A with a laser beam or beams, thereby performing laser machining along the position to be machined of the work. The control unit 6 (see FIG. 1) provided in the optical device 1 includes a microcomputer incorporating therein a memory for storing various data necessary for operations of the laser beam machining apparatus 100, etc.

The laser beam machining apparatus 100 according to this embodiment, with the optical device 1 being simple in configuration, is capable of branching a laser beam into two beams and controlling the spacing between the two beams. Therefore, it is possible with simple control to emit a single beam or two beams from the optical device; further, it is possible, in the case of emitting two beams, to easily control the spacing between the two beams.

Figure 6A:
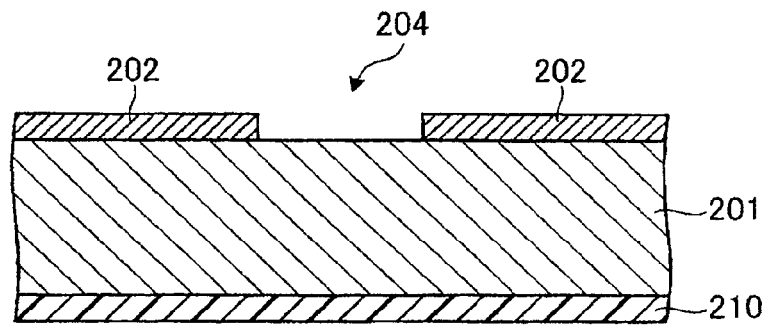
FIG. 6A is a sectional view of the vicinity of a planned cutting line on a wafer.
Figure 6B:
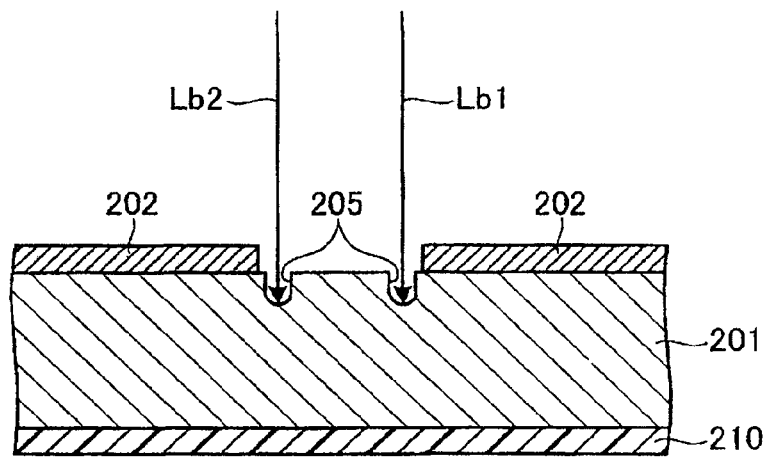
FIG. 6B is a sectional view showing a condition where the planned cutting line on the wafer is irradiated with branch beams at positions spaced by a predetermined spacing from each other.

Now, referring to FIGS. 6A to 6C, a method of forming dividing grooves along planned dividing lines on a wafer by use of the laser beam machining apparatus 100 will be described below. FIG. 6A shows a section of a wafer 201 which is provided on its face side with a plurality of devices 202 and planned dividing lines 204 demarcating the devices 202, and to the back side of which a release sheet 210 is adhered. First, the wafer 201 is suction-held on the holding surface 101A shown in FIG. 5. Thereafter, in the optical device 1, as for example shown in FIG. 3A, in the condition where a single beam is emitted from the beam splitter 31, alignment is carried out so that the position of irradiation with the laser beam coincides with the center of the planned dividing line.

Next, the first mirror 34 and the second mirror 36 are rotated relative to the beam splitter 31 by rotationally driving the rotating unit 37, as for example shown in FIG. 3B, thereby controlling the angle between the first branch beam Lb1 and the second branch beam Lb2 which are finally emitted from the beam splitter 31. In this condition, as shown in FIG. 6B, both end portions in the width direction of each planned dividing lines 204 are irradiated, along the line, with the first branch beam Lb1 and the second branch beam Lb2 spaced by a predetermined distance from each other, to form shallow grooves as film exfoliation preventive grooves 205. Here, the film exfoliation preventive grooves 205 are desirably formed in line symmetry about the center position of the planned dividing line 204. In this relation, according to the present invention, the first branch beam Lb1 and the second branch beam Lb2 are branched at equal angles with reference to the center of the planned dividing line 204, which makes it possible to easily perform control for forming the film exfoliation preventive grooves 205 at the positions in line symmetry about the center position of the planned dividing line 204.

Figure 6C:
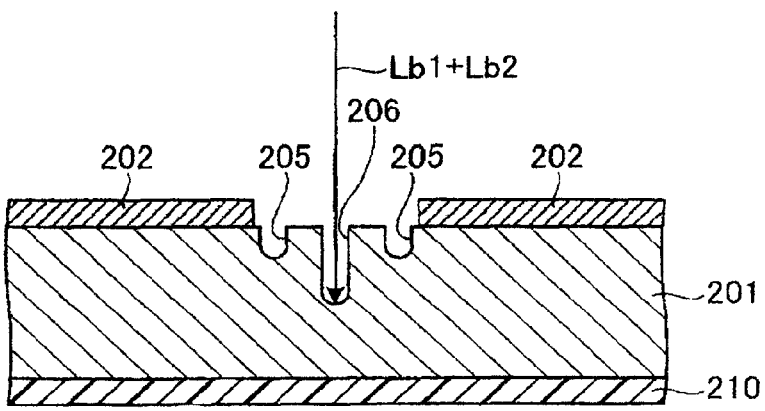
FIG. 6C is a sectional view showing a condition where a dividing groove is formed by irradiating the wafer with a laser beam along the center in the width direction of the planned cutting line on the wafer.

Thereafter, a control is conducted such that a single beam is emitted from the beam splitter 31 as shown in FIG. 3A, whereby a comparatively deep dividing groove 206 is formed along the line between the film exfoliation preventive grooves 205, as shown in FIG. 6C. Thereafter, it suffices to remove the wafer 201 and to divide the wafer 201 into individual chips by mechanical breaking.

As above-mentioned, use of the laser beam machining apparatus 100 configured as above is advantageous in that switching among an operation of emitting a single beam from the optical device 1 at the time of alignment of the wafer 201, an operation of emitting two beams from the optical device 1 at the time of forming the film exfoliation preventive grooves 205, and an operation of emitting a single beam from the optical device 1 at the time of forming the dividing groove 206 can be performed easily.

<Other Embodiments>

While some embodiments of the present invention have been described above, the descriptions and drawings constituting a part of the disclosure in the above embodiments are not limitative of the invention. From this disclosure, a variety of alternative embodiments and working examples and application technologies will be apparent to those skilled in the art. For instance, while the polarization beam splitter has been used as the beam splitter 31 and the quarter-wave plates have been used in the above embodiments, a configuration may naturally be adopted in which a non-polarization beam splitter is used and in which quarter-wave plates are not used.

Incidentally, the work is not particularly restricted. Examples of the work include semiconductor wafers such as wafers of silicon (Si), gallium-arsenic (GaAs), silicon carbide (SiC), etc., pressure sensitive adhesive materials such as DAF (Die Attach Film) provided on the back side of wafers for chip packaging purpose, or packages of semiconductor products, substrates of inorganic material such as ceramic, glass, sapphire ($Al_2O_3$), etc., various electronic parts such as liquid crystal display driver, etc., and, further, various to-be-machined materials requiring a machining positional accuracy on micrometer order.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:
an oscillator for emitting a laser beam;
a branching mechanism by which the laser beam emitted from the oscillator is branched into two laser beams, wherein the branching mechanism includes a beam splitter by which the laser beam oscillated from the oscillator is branched into a first branch beam going ahead through transmission and a second branch beam going ahead through reflection; and
a condenser for condensing the two laser beams going out of the branching mechanism,
wherein the branching mechanism further includes:
a first mirror by which the first branch beam going out of the beam splitter is reflected to go again toward the beam splitter,
a second mirror by which the second branch beam going out of the beam splitter is reflected to go again toward the beam splitter,
a rotating unit for integrally rotating the first mirror and the second mirror, with a laser beam branch point in the beam splitter as a center of rotation, and
a control unit for rotating the rotating unit to change an angle of incidence of the first branch beam on the first mirror and an angle of incidence of the second branch beam on the second mirror so as thereby to control an angle formed between the first branch beam reflected by the beam splitter after being reflected by the first mirror and the second branch beam transmitted through the beam splitter after being reflected by the second mirror; and
wherein the condenser is disposed on optical paths of the first branch beam which has been transmitted through the beam splitter, has thereafter been reflected by the first mirror to be again incident on the beam splitter, and has been reflected by the beam splitter to go out of the beam splitter, and
the second branch beam which has been reflected by the beam splitter, has thereafter been reflected by the second mirror to be again incident on the beam splitter, and has been transmitted through the beam splitter to go out of the beam splitter.

2. The optical device according to claim 1, wherein:
the beam splitter is a polarization beam splitter, and
the branching mechanism includes a first quarter-wave plate disposed between the laser beam branch point and the first mirror and a second quarter-wave plate disposed between the laser beam branch point and the second mirror.

3. The optical device according to claim 1, wherein the beam splitter is a half-mirror.

4. The optical device according to claim 1, wherein:
the branching mechanism further includes a first intermediate mirror by which the first branch beam going out of the beam splitter is reflected into a direction parallel to a rotational axis passing through the center of rotation, and a second intermediate mirror by which the second branch beam going out of the beam splitter is reflected into a direction parallel to the rotational axis passing through the center of rotation; and
the branching mechanism is so set that the first mirror causes the first branch beam reflected by the first intermediate mirror to be incident on the beam splitter at a position spaced along the rotational axis direction from the position of incidence of the laser beam oscillated from the oscillator, and that the second mirror causes the second branch beam reflected by the second intermediate mirror to be incident on the beam splitter at a position spaced along the rotational axis direction from the position of incidence of the laser beam oscillated from the oscillator.

5. A laser beam machining apparatus comprising:
holding means for holding a work; and
machining means for machining the work held by the holding means by irradiation with a laser beam,
wherein the machining means has an optical device including:
an oscillator for emitting a laser beam;
a branching mechanism by which the laser beam emitted from the oscillator is branched into two laser beams, wherein the branching mechanism includes a beam splitter by which the laser beam oscillated from the oscillator is branched into a first branch beam going ahead through transmission and a second branch beam going ahead through reflection; and
a condenser for condensing the two laser beams going out of the branching mechanism,
wherein the branching mechanism further includes:
a first mirror by which the first branch beam going out of the beam splitter is reflected to go again toward the beam splitter,
a second mirror by which the second branch beam going out of the beam splitter is reflected to go again toward the beam splitter,
a rotating unit for integrally rotating the first mirror and the second mirror, with a laser beam branch point in the beam splitter as a center of rotation, and
a control unit for rotating the rotating unit to change an angle of incidence of the first branch beam on the first mirror and an angle of incidence of the second branch beam on the second mirror so as thereby to control an angle formed between the first branch beam reflected by the beam splitter after being reflected by the first mirror and the second branch beam transmitted through the beam splitter after being reflected by the second mirror; and
wherein the condenser is disposed on optical paths of the first branch beam which has been transmitted through the beam splitter, has thereafter been reflected by the first mirror to be again incident on the beam splitter, and has been reflected by the beam splitter to go out of the beam splitter, and
the second branch beam which has been reflected by the beam splitter, has thereafter been reflected by the second mirror to be again incident on the beam splitter, and has been transmitted through the beam splitter to go out of the beam splitter.

* * * * *